United States Patent
Koba et al.

(10) Patent No.: US 7,303,636 B1
(45) Date of Patent: Dec. 4, 2007

(54) METHOD OF LASER CLEANING SURFACES ON A HEAD SUSPENSION

(75) Inventors: Hryhory T. Koba, Hutchinson, MN (US); Gary L. Hoikka, Cokato, MN (US); Derek J. Schanil, Watkins, MN (US); Brett T. Holaway, Cosmos, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 119 days.

(21) Appl. No.: 10/687,158

(22) Filed: Oct. 16, 2003

(51) Int. Cl.
*B08B 6/00* (2006.01)

(52) U.S. Cl. .................... 134/1; 360/245.4; 360/245.3; 360/255

(58) Field of Classification Search .................... 134/1, 134/1.1, 56 D, 57 D, 58 D, 94.1, 110, 111, 134/184, 186; 360/245.3, 245.4, 255
See application file for complete search history.

(56) References Cited

U.S. PATENT DOCUMENTS

| | | | |
|---|---|---|---|
| 4,671,848 A | 6/1987 | Miller et al. | |
| 5,024,968 A * | 6/1991 | Engelsberg | 438/597 |
| 5,151,134 A * | 9/1992 | Boquillon et al. | 134/1 |
| 5,319,183 A * | 6/1994 | Hosoya et al. | 219/121.68 |
| 5,482,561 A * | 1/1996 | Yeung et al. | 134/1 |
| 6,154,952 A | 12/2000 | Tangren | |
| 6,288,876 B1 * | 9/2001 | Albrecht et al. | 360/245.3 |
| 6,394,105 B1 * | 5/2002 | Boszormenyi et al. | 134/1.3 |
| 2002/0170892 A1 | 11/2002 | Lee et al. | |

FOREIGN PATENT DOCUMENTS

| | | |
|---|---|---|
| JP | 2000202385 | 7/2000 |
| JP | 2000288496 | 10/2000 |
| WO | WO 91/01514 | 2/1991 |

OTHER PUBLICATIONS

Walters et al., *Advanced Technology Cleaning Methods for High-Precision Cleaning of Guidance System Components*, 1993, (Article).

* cited by examiner

*Primary Examiner*—Michael Barr
*Assistant Examiner*—Saeed T. Chaudhry
(74) *Attorney, Agent, or Firm*—Faegre & Benson LLP (57) ABSTRACT

A method of cleaning an contaminated surface on a head suspension with laser energy. A laser beam is patterned such that a single pulse extends across the entire contaminated surface. One or more pulses of the laser energy is applied to the contaminated surface sufficient to melt the contaminated surface. The melting serves to polish, smooth and/or reshape the contaminated surface.

8 Claims, 7 Drawing Sheets

METHOD OF LASER CLEANING SURFACES ON A HEAD SUSPENSION

FIELD OF THE INVENTION

The present invention relates to a method of cleaning surfaces on a magnetic head disk drive suspension, and in particular, to laser cleaning contaminated surfaces of head suspensions and portions thereof.

BACKGROUND OF THE INVENTION

In a dynamic rigid disk storage device, a rotating disk was employed to store information. Rigid disk storage devices typically included a frame to provide attachment points and orientation for other components, and a spindle motor mounted to the frame for rotating the disk. A read/write head was formed on a "head slider" for writing and reading data to and from the disk surface. The head slider was supported and properly oriented in relationship to the disk by a head suspension that provided both the force and compliance necessary for proper suspension operation. As the disk in the storage device rotated beneath the head slider and head suspension, the air above the disk also rotated, thus creating an air bearing which acted with an aerodynamic design of the suspension to create a lift force on the head slider. The lift force was counteracted by a spring force of the head suspension, thus positioning the suspension at a desired height and alignment above the disk that is referred to as the "fly height." Typically, the magnetic head was about 0.02 microns away from the disk while the disk was moving.

Figure 1:
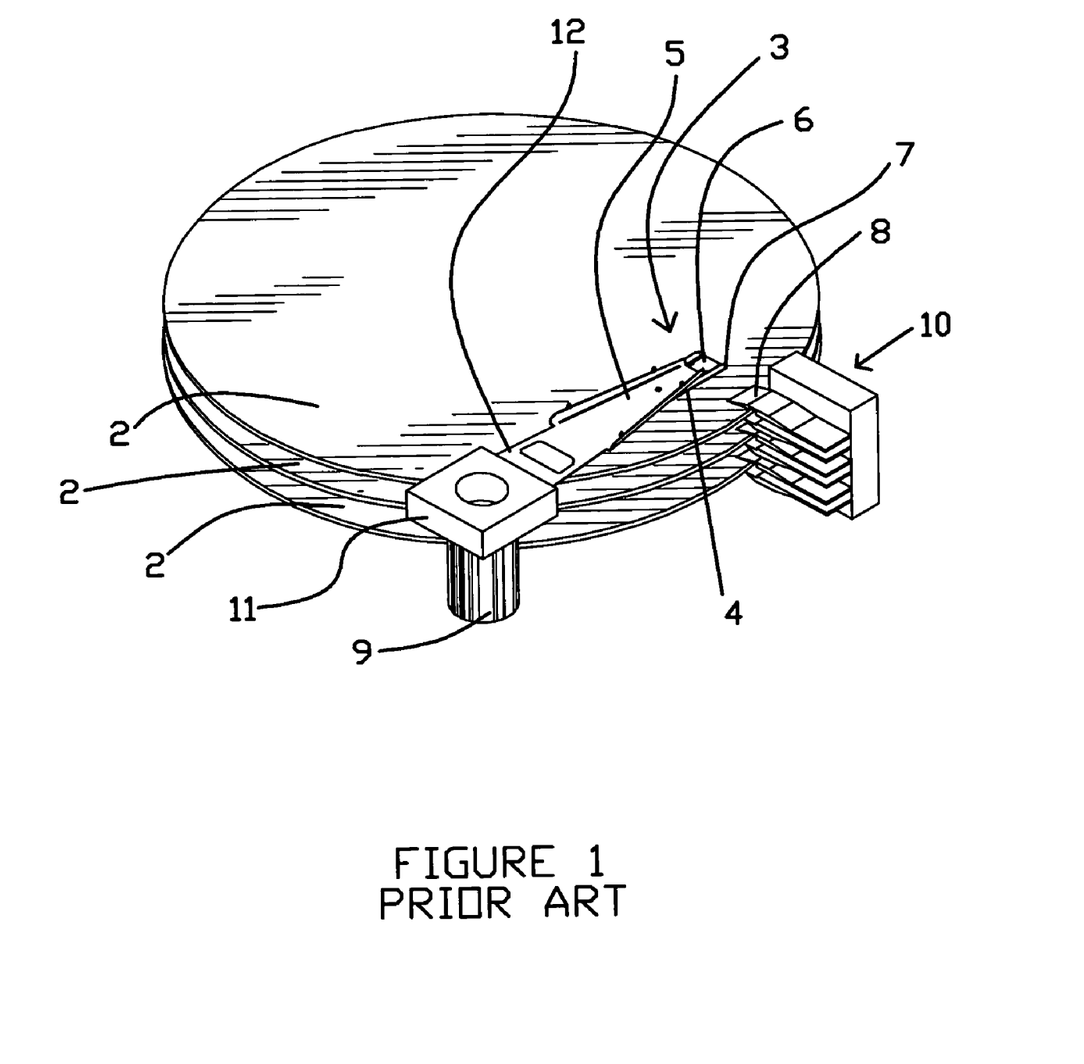
FIG. 1 illustrates internal components of a data storage hard drive according to the prior art.

Prior art FIG. 1 shows a typical load/unload type hard drive with three disks 2. A head suspension 3 comprises a flexure 4 and a load beam 5, and head slider 6. A magnetic read/write head (not shown) is located on the head slider. The head suspension 3 pivots about a pivot post 9. The head slider 6 includes a lift tab 7 positioned so that it engages a ramp 8 on a ramp structure 10. The ramp 8 imparts an upward force on the lift tab 7, which lifts the load beam 5 and magnetic head away from the disk 2. The magnetic head is thereby not in contact with the disk 2 whenever the lift tab 7 is moved onto the ramp 8. In order for the lift tab 7 to lift the suspension from the disk, the lift tab must rub against the ramp 8. The ramp structure 10 is typically made from low friction polymer materials. Low friction ramps 8 reduce the amount of energy required to unload the magnetic heads (a concern during unpowered unloading). The head suspension includes a base plate 11 in the mounting region 12 to connect the head suspension to the pivot arm.

Figure 2:
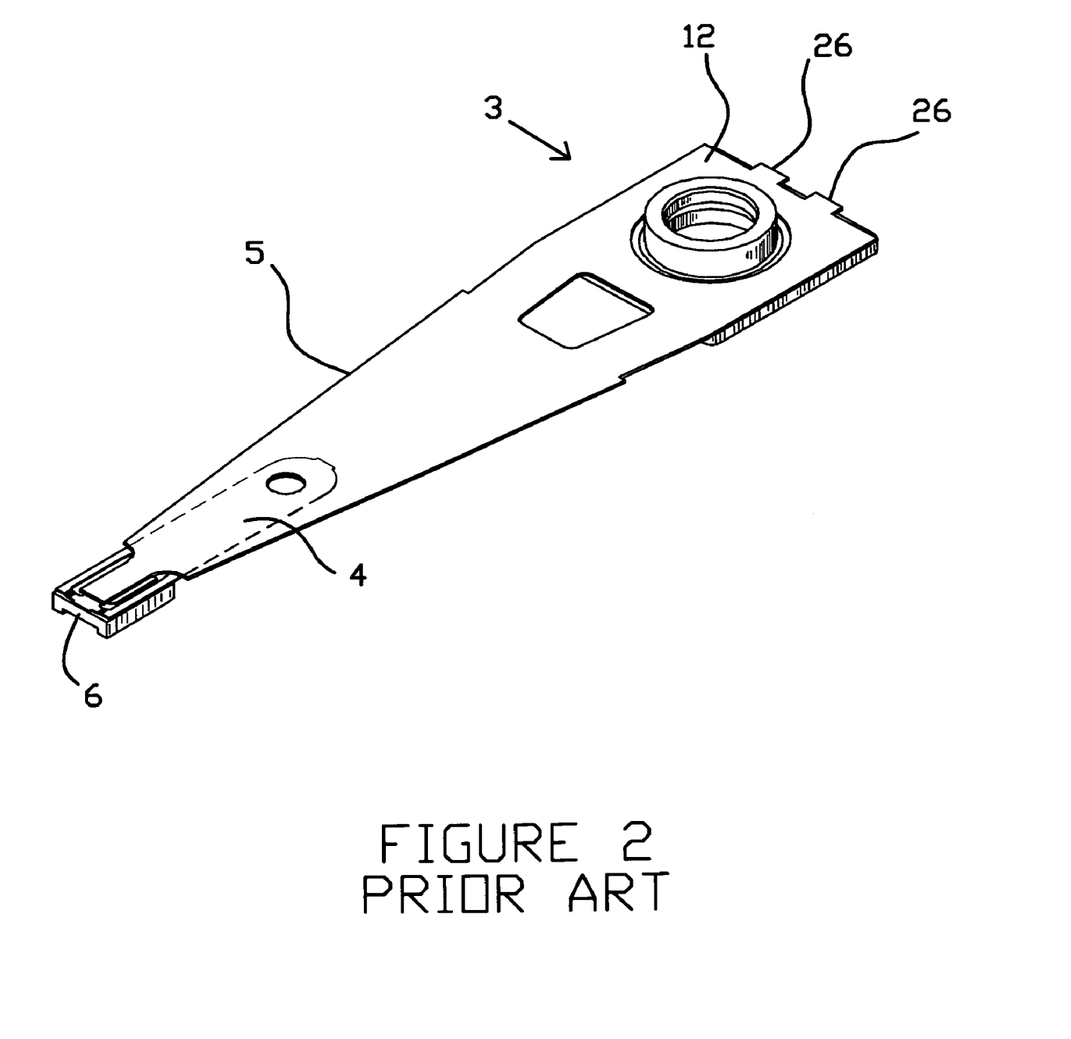
FIG. 2 shows a head suspension according to the prior art.

Prior Art FIG. 2 shows the bottom side of a head suspension. Features of head suspension, support arms and suspensions are often stamped or coined from sheet metal. The extreme pressure used to stamp the parts, however, caused the die surface to degenerate through metal transfer. The area of highest pressure can become rougher than it was before the stamping or coining operation. Because of the nature of the coining process, the highest pressure is typically at the apex of the feature, which is typically the operative surface. Features smoothed by the coining process still produce debris when rubbed, such as against a ramp or a tang in a gimbal assembly, causing particulate contamination inside the disk drive and hence reduced reliability.

Figure 3:
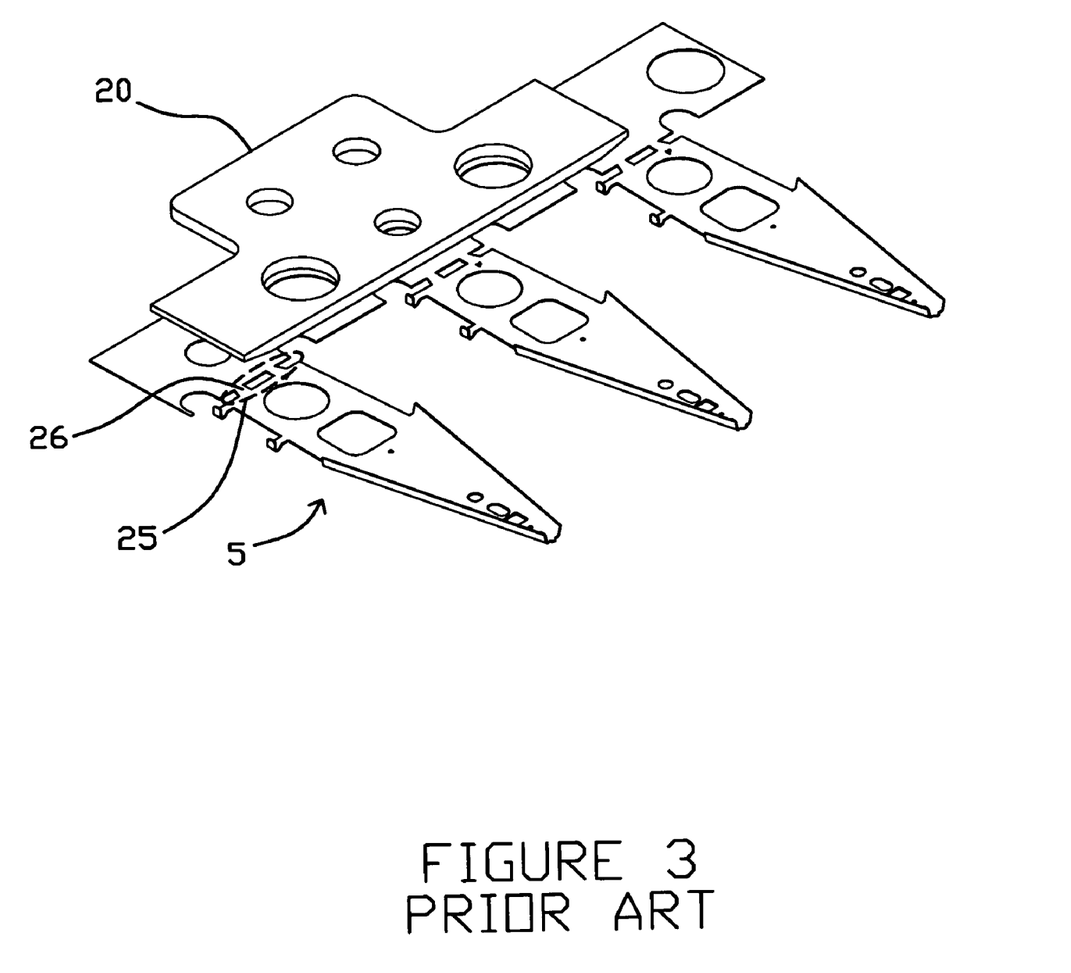
FIG. 3 is a plan view of a ribbon containing multiple load beams of the prior art.

Referring now to prior art FIG. 3, thereshown is a ribbon 20 of load beams 5. Load beams 5 were, in one embodiment, etched out of sheet metal. Each load beam 5 was attached to ribbon 20 at an attachment region 25. The attachment region was a continuous junction between the head suspension and the ribbon, or may be one or more tabs 26 with open space otherwise between the head suspension and the ribbon. Much of the processing of the load beams 5 occurred when they were still attached to the ribbon 20. The individual arms are generally separated when the common processing steps of the head suspensions have been performed. Separation of the head suspension from the ribbon is usually performed by cleaving through the attachment region to cut the solid connection or the tabs.

Shearing and forming processes used to create features on the head suspensions and suspensions generated debris. The debris was sometimes dislodged and landed on the disk causing damage to the disk.

SUMMARY OF THE INVENTION

The present invention relates to a method of and structure resulting therefrom, for using pulsed laser energy to clean contaminated surfaces on head suspensions and suspensions. The present method produces very smooth surfaces at a relatively low cost. The process is scalable for volume production. The present method can be used with contaminated surfaces having a wide variety of structures and shapes. The process provides for reduced particulate contamination inside a data storage hard drive, leading to higher reliability.

In one embodiment, the method of cleaning an contaminated surface includes patterning a laser beam such that a single pulse extends across the entire contaminated surface and applying one or more pulses of the laser energy to the contaminated surface sufficient to melt the contaminated surface. The laser pulse serves to clean the contaminated surface.

The melting of the contaminated surface is typically to a depth of about 0.5 micrometers. The melting of the contaminated surface continues until the surface is particle free. The entire contaminated surface preferably is melted simultaneously.

In one embodiment, the method includes determining a fluence and pulse duration such that a single pulse just starts to melt the tops of surface irregularities on the contaminated surface.

In one embodiment, a mask is interposed between the source of the pulsed laser energy and the contaminated surface. The mask includes an aperture adapted to shape the laser energy to a shape generally corresponding to a shape of the contaminated surface. In some embodiments, the laser energy is directed through one or more lens located between the mask and the contaminated surface.

DETAILED DESCRIPTION OF THE INVENTION

Figure 4A:
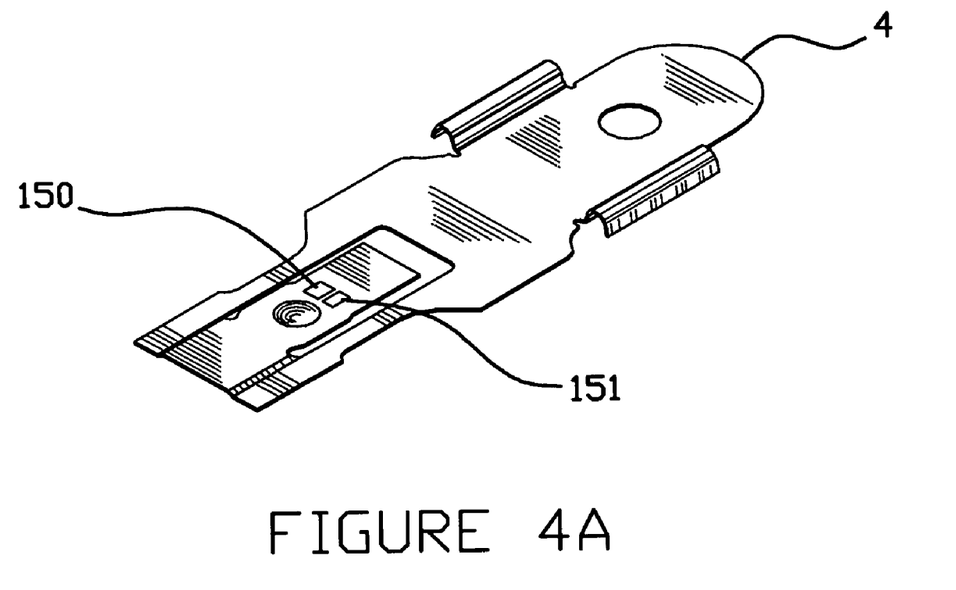
FIG. 4A is a perspective view of a suspension.
Figure 4B:
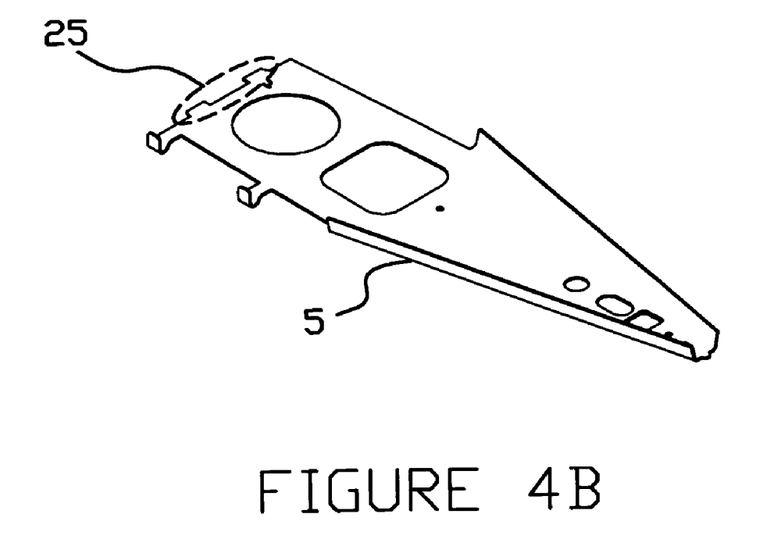
FIG. 4B is a perspective view of a load beam separated from the ribbon.

Referring now to FIGS. 4A and 4B, thereshown are a flexure 4 and a load beam 5. Normally, the flexure and load beam are welded together while still on the ribbons. However, for clarity, they are being shown separately in the Figures. As can be seen from FIGS. 6A and 7A, the attachment region 25 may carry remnants 40-43 of the connection to the ribbon 20. While remnants 40, 42 and 43 may be small (e.g. sub micron size), remnant 41 is relatively large (e.g. 2-5 microns). It is desirable to have a single process that removes both large and small remnants.

Further, the processing of the head suspension through the formation of the lift tabs and other features may leave remnants and other debris on the surface of the head suspension. It is desirable to remove the remnants and debris prior to putting the head suspension into normal use.

Figure 5A:
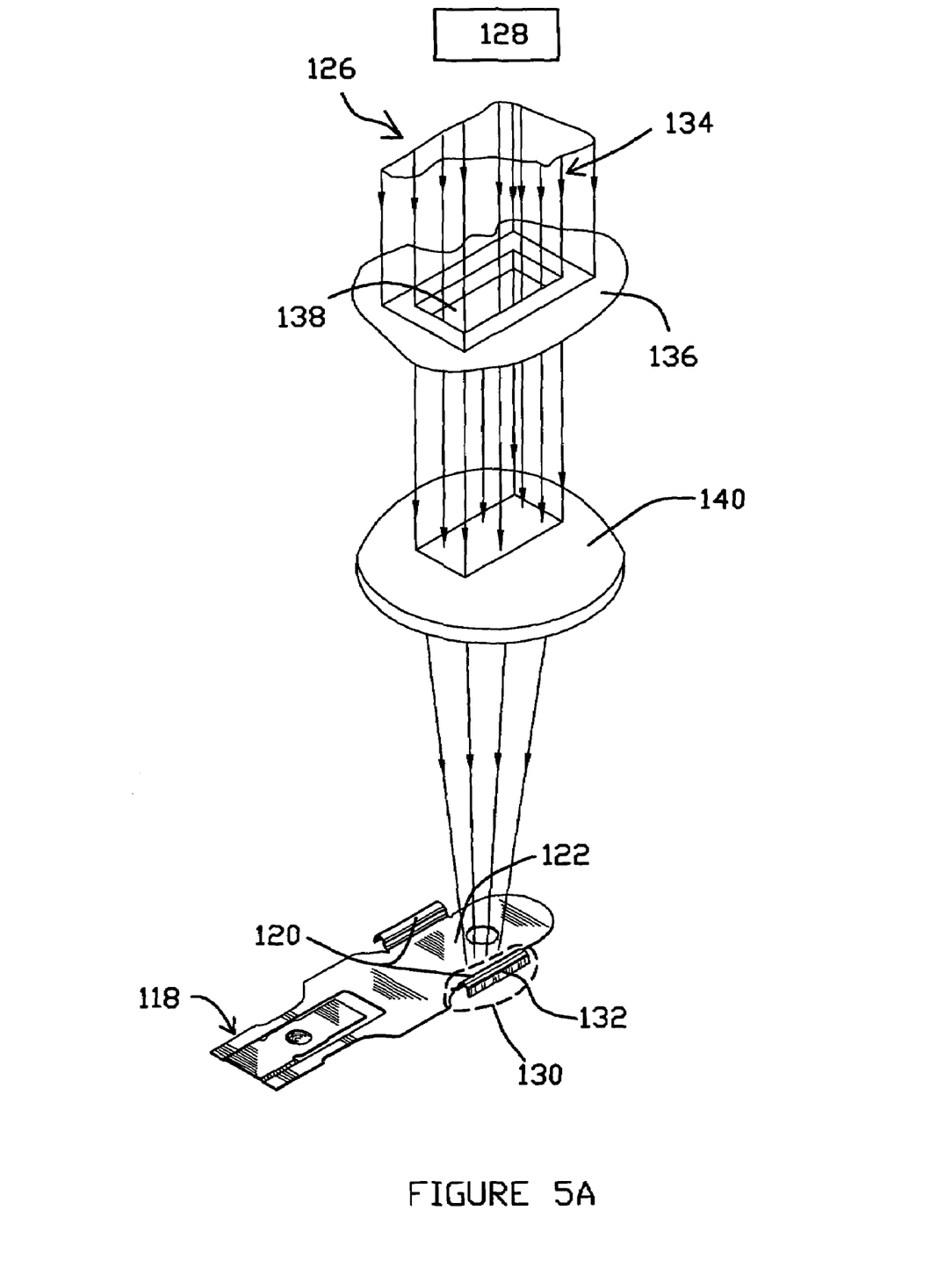
FIGS. 5A and 5B is a schematic illustration of a system for laser cleaning an contaminated surface in accordance with the present method.
Figure 5B:
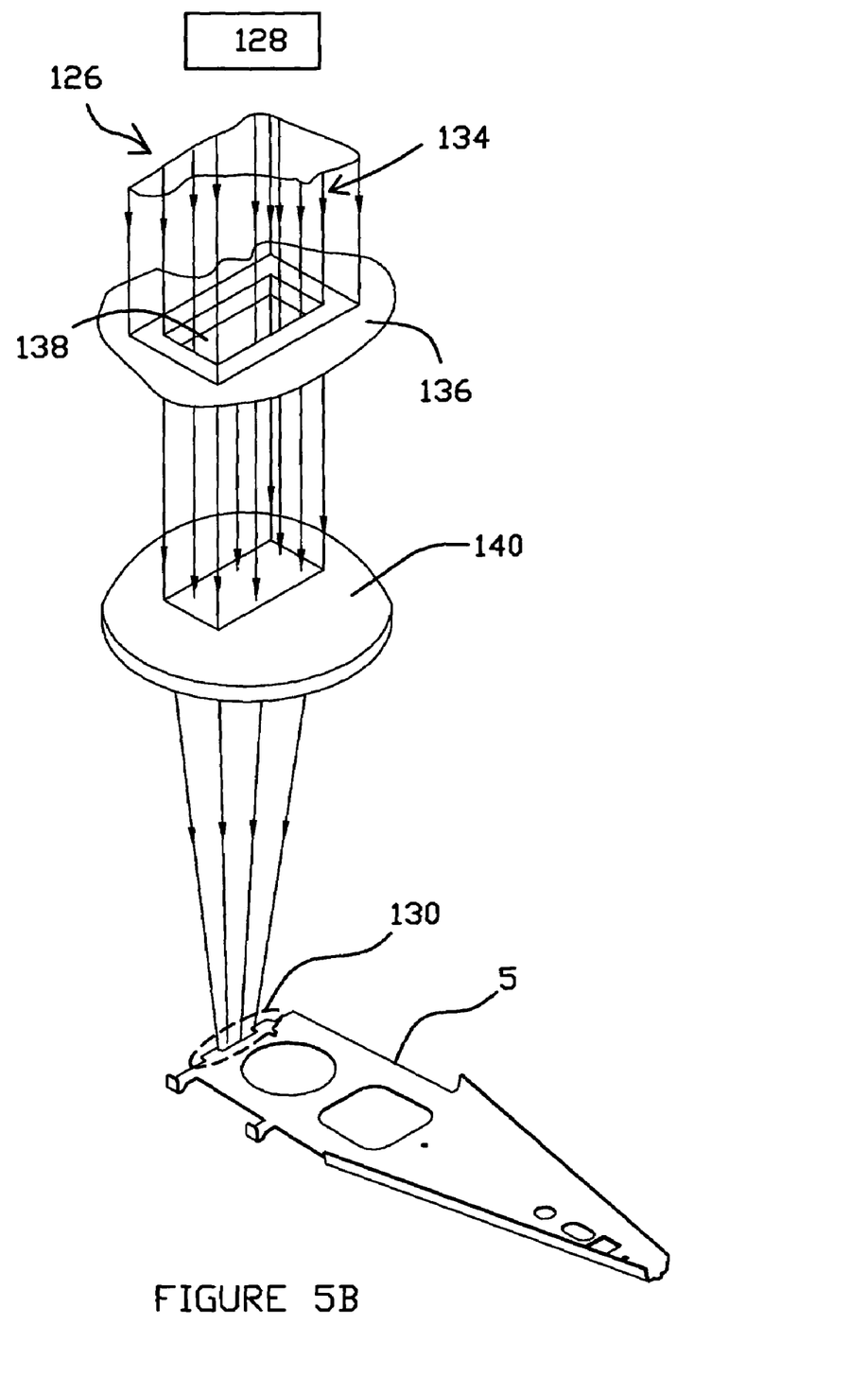

The system 126 of FIGS. 5A and 5B includes laser 128 that generates laser beam 134 with a cross sectional area large enough to simultaneously extend across at least the contaminated surface 132. In practice, however, the laser beam 134 typically extends across a larger region 130, of which the contaminated surface 132 is a subset. Since the region 130 (referred to as the "cleaning region" after application of pulsed laser energy) includes the contaminated surface 132 of the lift tabs 120, scanning the laser beam 134 across the work piece is not required. Consequently, overlap marks are eliminated. The shape of the cleaning region 130 is determined by aperture 138 in mask 136 that the laser beam 134 is patterned through. The aperture 138 can be a simple geometric shape (such as a circle, square, rectangle, etc.) or any complex shape.

In at least some embodiments, after the laser beam 134 is shaped by the mask 136, it can be focused and sized by lens 140. The lens is typically located between the mask 136 and the cleaning region 130. The lens 140 typically does not change the shape of the laser beam 134 (or the shape of the cleaning region 130). Rather, the aperture 138 in the mask 136 sets the energy range and the shape of the laser beam 134, while the lens 140 adjusts the size of the laser beam 134 at the cleaning region 130 and the fluence or energy/unit area applied to the cleaning region 130. A typical lens 140 is a plano/convex or convex/convex lens. The lens 140 may be made from UV fused silica and is typically coated with a UV antireflection coating. A commercially available lens suitable for this application is the 50.8 millimeter, 500 millimeter focal length plano/convex lens with a broad band UV antireflection coating sold under model number SPX058 by Newport Corporation of Irvine, Calif.

As illustrated in FIG. 5A, the lift tabs 120 are laser cleaned using a system 126 of the present invention. Each of the lift tabs 120 can be laser cleaned separately or simultaneously. As used herein, "laser clean" refers to treating, cleaning, smoothing and/or shaping an contaminated surface using one or more pulses of laser energy where each pulse extends across the entire contaminated surface. Cleaning may include melting of or vaporization of remnants.

As illustrated in FIG. 5B, the cleaning region 130 is laser cleaned using system 126 of the present invention. Small remnants may be vaporized while, larger remnants 46 may be melted to present a lower profile and to fill in cracks in the surface.

Figure 6A:
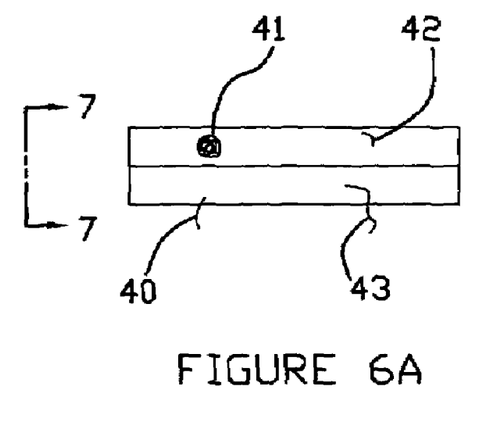
FIG. 6A is a close up plan view of the joining region of the load beam before laser cleaning.
Figure 7A:
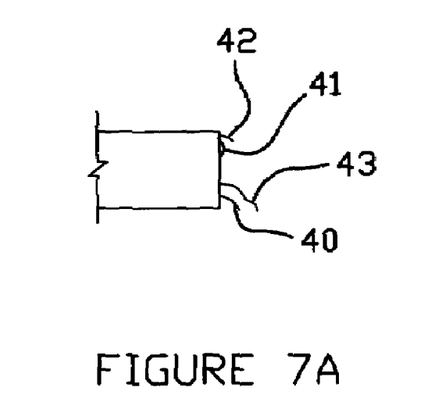
FIG. 7A is a close up side view of the joining region of the load beam before laser cleaning.

FIGS. 6A and 7A depict a front and side view of the cleaning region after being cleaned using the laser as shown in FIG. 5A. As can be seen, the small remnants 40, 42 and 43 have been removed. Large remnant 41 has been melted back into the surface of the connection region.

Figure 6B:
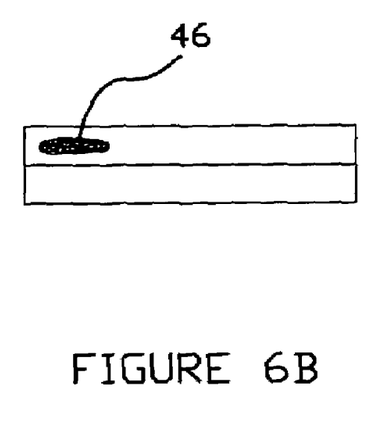
FIG. 6B is the same view after laser cleaning.
Figure 7B:
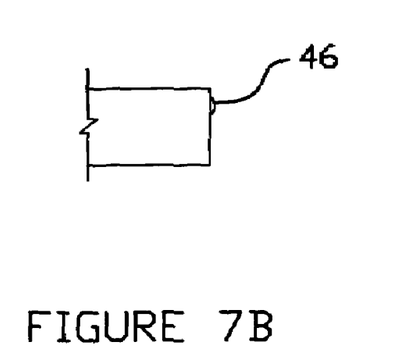
FIG. 7B is the same view after laser cleaning.

FIGS. 6B and 7B depict a front and side view of the cleaning region after being cleaned using the laser as shown in FIG. 5B. Large remnant 46 (of tab 26) has been melted back into the surface of the connection region.

A single pulse of laser energy may be used to clean surfaces. The laser energy may also be delivered pulsed in short bursts. The laser 128 is preferably a short wavelength pulsed laser with a beam that is patterned to cover the entire contaminated surface 132, without scanning.

In one embodiment, an inert gas can be blown over the work piece to prevent oxidization. Alternatively, the cleaning operation can be performed in a sealed chamber containing nitrogen or an inert gas to prevent oxidization.

The laser 128 is preferably an Excimer laser operating in a wavelength range of approximately 193-351 nanometers. In one embodiment, the laser operates at 248 nanometers. Pulse widths may be between 5 and 50 nano seconds. In one embodiment, the pulse width is 20 nano seconds. It is presently the opinion of the applicants that the shortest possible pulse for accomplishing the cleaning operations is better for the treated area as it avoids warpage and cracking of the treated area. Most metals absorb the relatively short wavelength of the Excimer laser. The cross-section of the laser beam 134 from the Excimer laser can be patterned to any two dimensional shape. The laser beam 134 can be patterned through an aperture or photo tool to give the desired shape. In the case of lift tabs 120, a generally rectangular shape is preferred. For load point dimples, discussed below, a circular shape is preferred. The cleaning region 130 is preferably larger than the contaminated surface 132 to compensate for positioning errors during cleaning.

Other features of a head suspension or flexure such as polyimide pads 150 and electrical termination (bond) pads 151 may also be cleaned using this process. The laser fluence need to be adjusted for the these materials so that only a desired amount of melting occurs.

The method of the present invention is to simultaneously apply pulsed laser energy to an entire contaminated surface on a head suspension. In the method of the preferred embodiment, it is important to minimize the amount of heating of the cleaning region 130 to minimize warping of the head suspension. Lift tabs and load point dimples cleaned according to the method described herein have exceptionally clean surfaces that will not release particles onto the HDD deck surface during HDD operation.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method for manufacturing a head suspension component for a rigid disk drive, the method comprising the steps of:

providing a ribbon having one or more spring metal head suspension components extending from the ribbon;

separating a head suspension component from the ribbon at an attachment region, including forming a contaminated surface having adhered spring metal remnants at the attachment region;

patterning a laser beam such that a single pulse extends across a portion of the head suspension component including the contaminated surface; and applying one or more pulses of the patterned laser beam having laser energy sufficient to laser clean the contaminated surface by vaporizing the adhered spring metal remnants on the contaminated surface.

2. The method of claim 1 wherein the entire contaminated surface is laser cleaned simultaneously.

3. The method of claim 1 wherein the contaminated surface comprises stainless steel.

4. The method of claim 1 comprising the further step of determining a fluence such that a single pulse just starts to vaporize surface irregularities on the contaminated surface.

5. The method of claim 1 wherein the step of patterning the laser beam comprises the step of interposing a mask between a source of the laser beam and the contaminated surface.

6. The method of claim 5 wherein the mask comprises an aperture adapted to shape the laser beam to a shape corresponding to a shape of the contaminated surface.

7. The method of claim 5 comprising directing the laser beam through a lens located between the mask and the contaminated surface.

8. The method of claim 5 wherein the step of patterning the laser beam comprises the step of interposing at least one lens between the mask and the contaminated surface.

* * * * *